(12) United States Patent
Thomson

(10) Patent No.: US 7,367,599 B2
(45) Date of Patent: May 6, 2008

(54) INFLATABLE BUMPER CAR

(76) Inventor: Dean Thomson, Wing on Plaza, Suite 128 on First Floor, 82 Medy Road, Tsim Sha Tsol East, Hong Kong, Kowloon (CN)

( * ) Notice: Subject to any disclaimer, the term of this patent is extended or adjusted under 35 U.S.C. 154(b) by 209 days.

(21) Appl. No.: 11/177,074

(22) Filed: Jul. 9, 2005

(65) Prior Publication Data

US 2007/0007779 A1   Jan. 11, 2007

(51) Int. Cl.
 *B60R 19/42* (2006.01)
(52) U.S. Cl. ..................................... 293/127
(58) Field of Classification Search ................. 293/127
 See application file for complete search history.

(56) References Cited

U.S. PATENT DOCUMENTS

| | | | | |
|---|---|---|---|---|
| 3,938,828 A | * | 2/1976 | Hammond | ............... 280/261 |
| 4,324,301 A | * | 4/1982 | Eyerly | ..................... 180/2.1 |
| 4,606,728 A | * | 8/1986 | Simpson | ..................... 441/66 |
| 5,516,169 A | * | 5/1996 | Falk et al. | ............... 293/127 |
| 2004/0087224 A1 | * | 5/2004 | Hart | ........................... 440/21 |
| 2005/0091921 A1 | * | 5/2005 | Weder | ........................ 47/72 |

\* cited by examiner

*Primary Examiner*—Lori L. Lyjak
(74) *Attorney, Agent, or Firm*—Clement Cheng

(57) ABSTRACT

An inflatable bumper car has an inflatable structure having a seating area and a lower cavity. The frame structure fits within the lower cavity of the inflatable structure. The steering wheel has an electrical control. The wheels are mounted on the frame structure. Optionally, the inflatable bumper car has a separately inflatable seat cell and a separately inflatable skirt cell that substantially surrounds the car. The bumper car has a battery, motor and steering wheel.

13 Claims, 6 Drawing Sheets

INFLATABLE BUMPER CAR

DISCUSSION OF RELATED ART

Children's ride on vehicles have traditionally been popular because they allow a varied mobility for infants learning to walk, or toddlers having fun pretending to drive full-sized vehicles. Unfortunately, using such vehicles inside the house would make parents very worried that their children would be hurt, or break things inside the house. Using the vehicles outside requires keeping the kids out of the street, which is no fun for the parents either. Therefore, what is needed is a safer ride toy vehicle for children.

DETAILED DISCUSSION OF THE PREFERRED EMBODIMENT

The present invention has an inflatable structure at least partially surrounding a frame structure. A pair of rear wheels and optionally a motor and battery provide propulsion allowing the child operation of the electric vehicle. The steering wheel is preferably connected to a single front wheel allowing steering of the vehicle. The frame structure is rigid.

Figure 6:
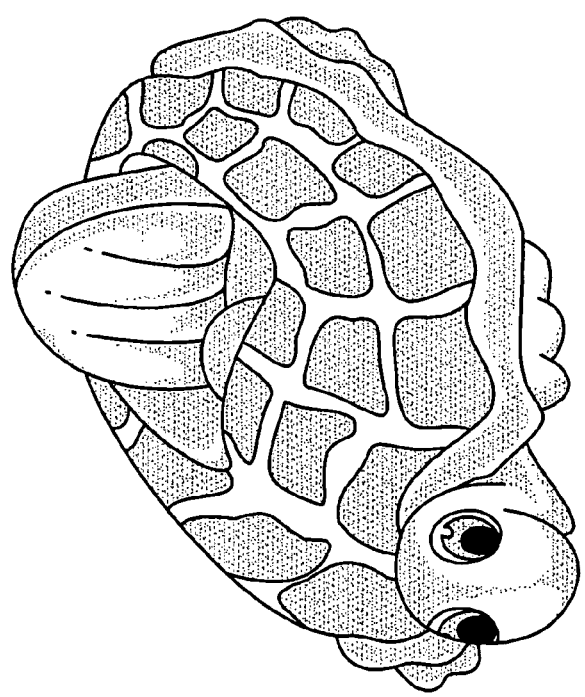
FIG. 6 is a turtle styled bumper car.
Figure 7:
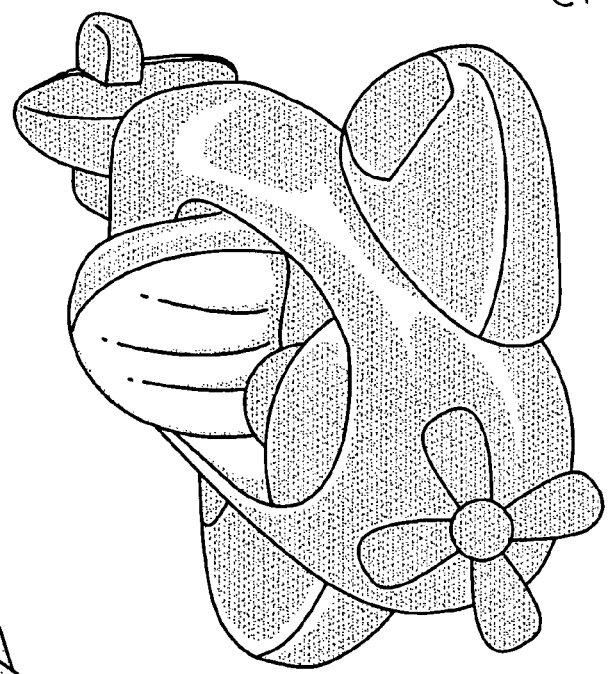
FIG. 7 is an airplane styled bumper car.

The inflatable structure can be styled as a racecar, or other fanciful design such as an aquarium. For example, the racecar can have a spoiler. The exterior of the inflatable structure can portray graphic pictures of wheels imprinted on the flexible inflatable structure allowing a suggestion that the inflatable structure is the outer surface of a vehicle. As an alternate embodiment, the inflatable structure encompasses only the front portion of the vehicle. The inflatable structure preferably includes multiple cells having separate contained units of air. The multiple cells allow differential air pressure between different portions of the inflatable structure. The design of the outer inflatable structure can be made in a wide variety of children's themes. FIG. 6 shows a turtle styled car and FIG. 7 is an airplane styled bumper car.

Optionally, the steering column protrudes through the inflatable structure providing stability and security for the connection between the inflatable structure and bottom frame structure. After assembly, the steering wheel preferably protrudes only slightly beyond the inflatable structure.

The preferred mode is to have a steering column cell providing support for the steering column, and a single upper cell formed as a torus shape above the lower cell formed as a torus shape. The steering column cell can be made transparent allowing viewing through the steering column cell. Formed as a separate inflatable cell of the inflatable structure is the seat preferably having a back for a child to sit on the seat. The legs of a user fit in the well between the seat and the torus shaped perimeter. The inflatable structure also forms a top cavity forming a passenger driver compartment. The inflatable structure is preferably styled of nylon durable fabric allowing the vehicle to rebound and brush up against obstacles.

The aquarium embodiment is shown in figure one. The print includes bubbles 150 and fish 160 printed on the outer skirt 110, which is inflatable. The outer skirt 110 is shown as a single sheet of nylon material wrapping around the side of the inflatable structure 100 and being joined at the seam 120 in the front middle of the device. The valve for inflating the inflatable structure 100 has a cover 140 hiding the valve. The seat 170 is preferably pleated conforming to the outer skirt 110. The steering column cell 130 is seen as transparent having reflection of a pair of overhead fluorescent tubular light fixtures. The steering column cell has a single inflation valve 131 disposed on the exterior. The steering column 135 protrudes through the inflatable structure via a steering column sleeve 134 terminating with a steering wheel 136 having a control 138 on top of the steering wheel 136. The steering wheel is made in circular configuration, preferably plastic and having a connection to the steering column 135. The control 138 allows a user to move forward. The control 138 is made of at least a single switch providing battery-powered to the motor for motion. A second switch in the control 138 would allow the child user to reverse direction, or stop. The switch is electrically connected to the electrical system including the motor and battery through wires running from the control through the steering column 135 and to the plastic casing below. Because the electrical system is relatively simple, and well understood in the art, further discussion of the electrical system is not necessary.

Figure 1:
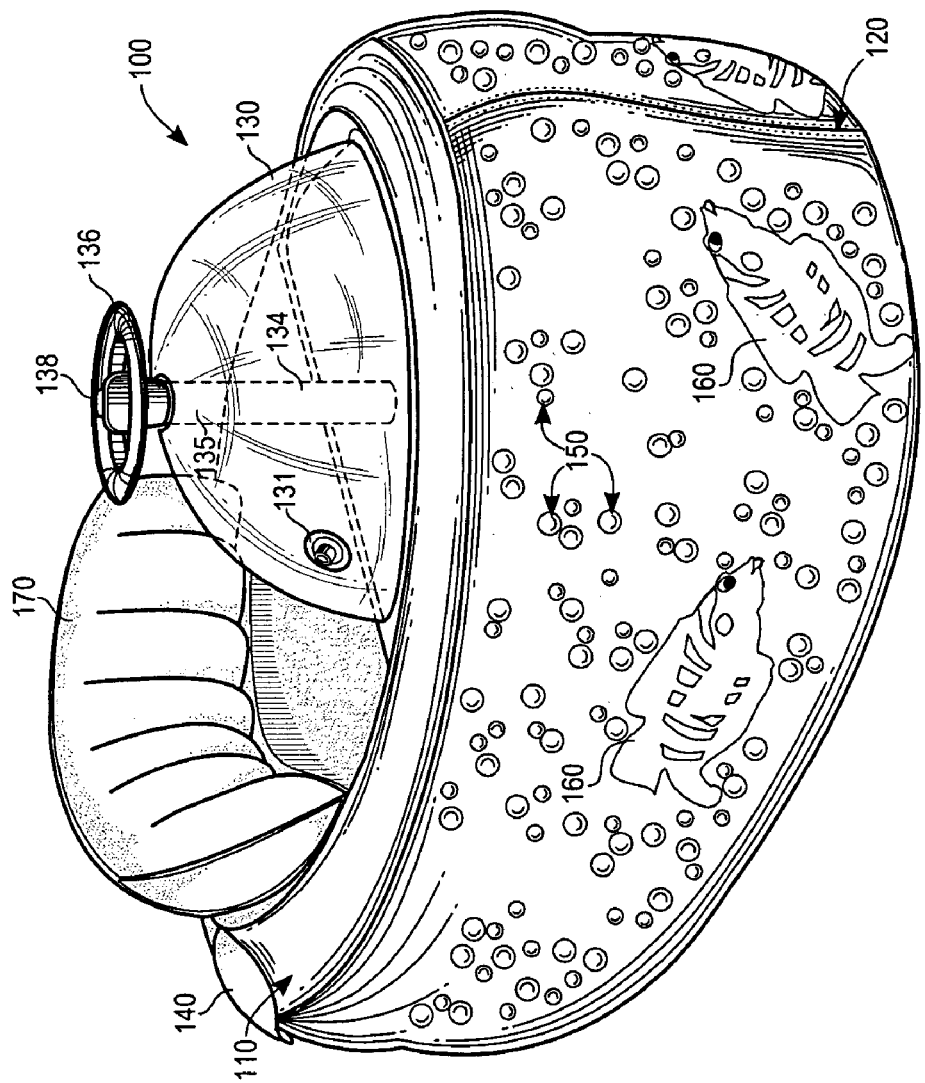
FIG. 1 is a front perspective view of an aquarium styled bumper car.
Figure 2:
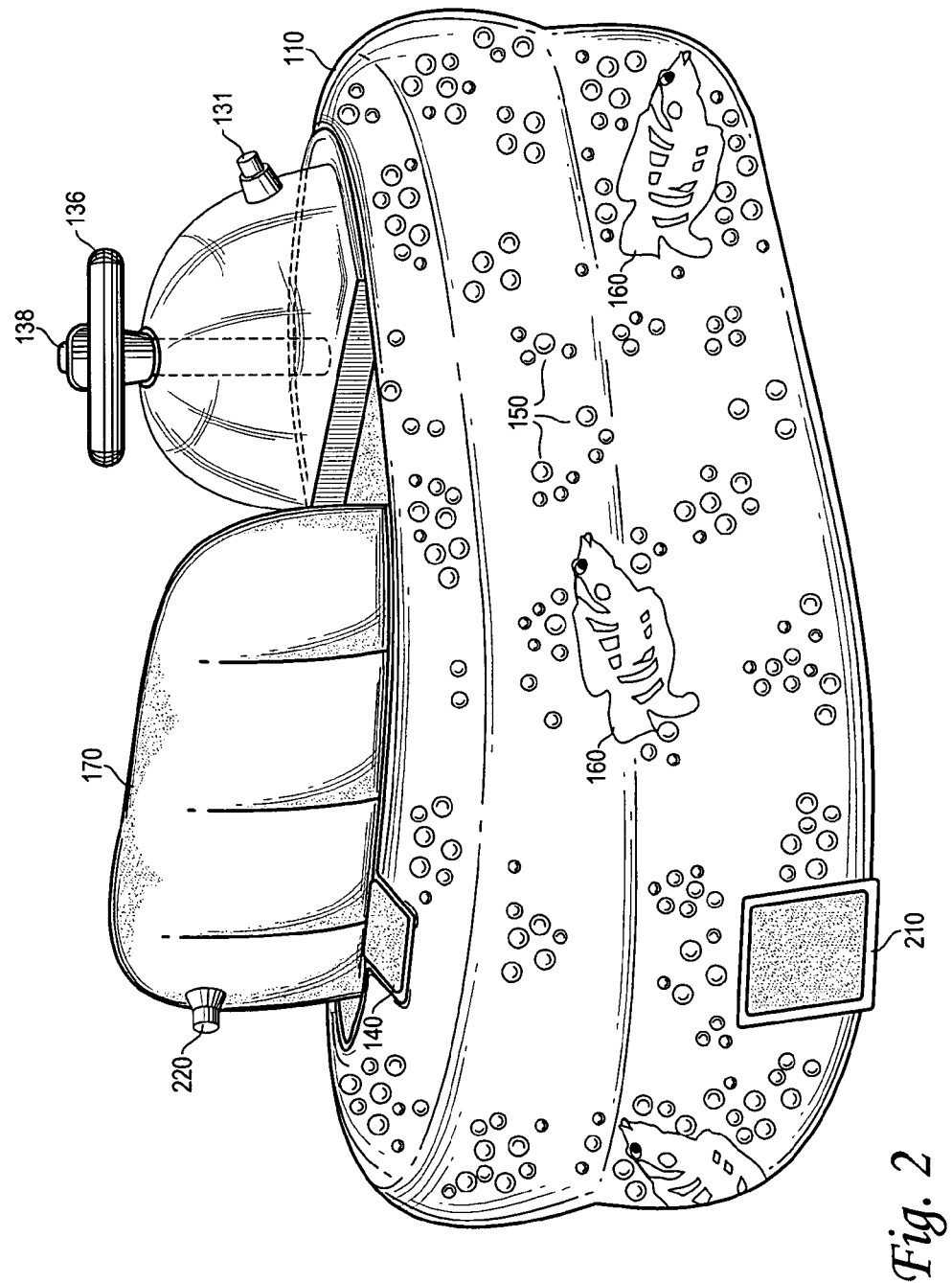
FIG. 2 is a rear perspective view of the aquarium styled bumper car.

FIG. 2 shows a rear view of the aquarium embodiment of the present invention with the dual cell outside skirt configuration. The flap enclosing the upper valve is the upper flap 140. The lower flap 210 allows inflation of the lower cell that is placed below the upper cell. The lower and upper cells are stacked vertically. The air pressure can be varied allowing a softer lower, or a softer upper. The seat back 170 protrudes above the top surface of the outside skirt 110 and is inflated separately by the seat inflation valve 220.

Figure 3:
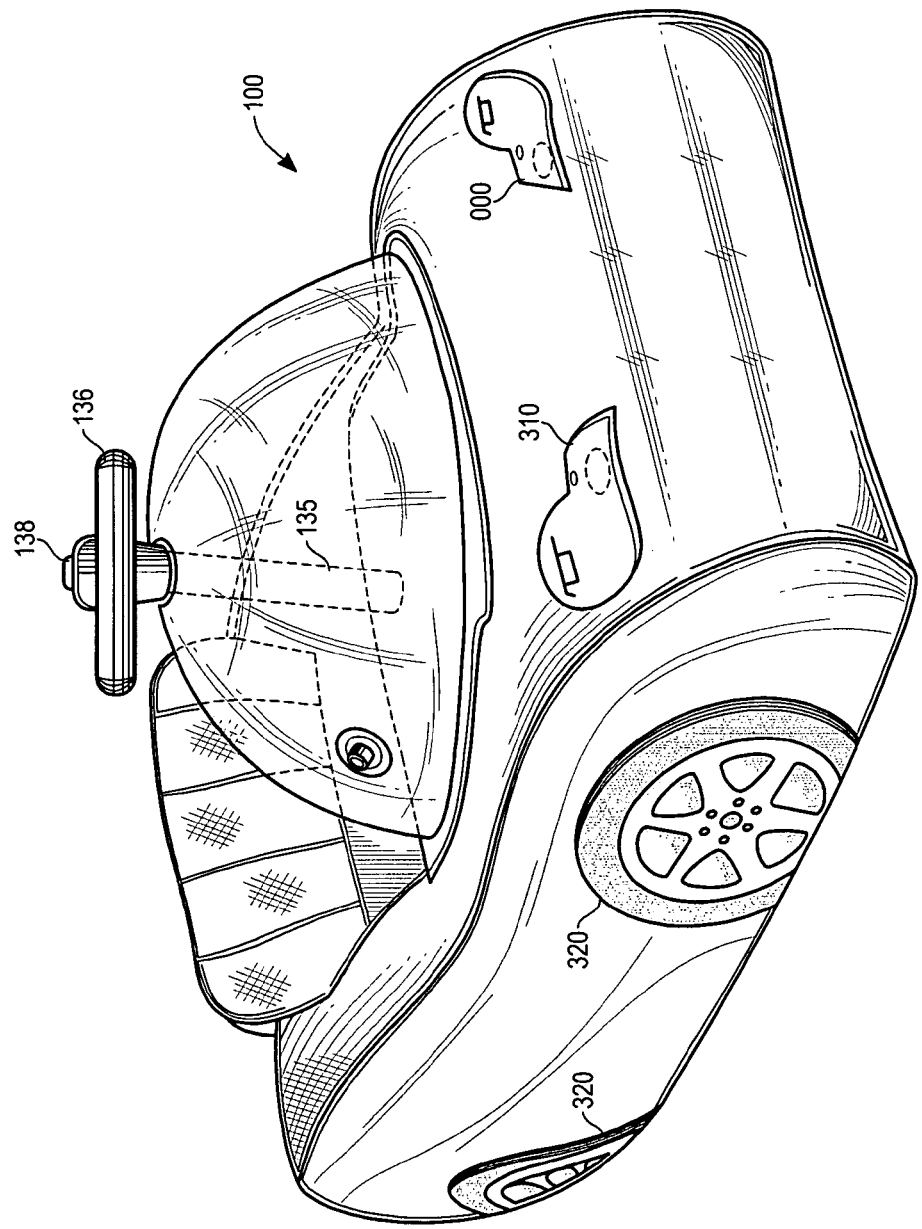
FIG. 3 is a front perspective view of a racecar styled bumper car.
Figure 4:
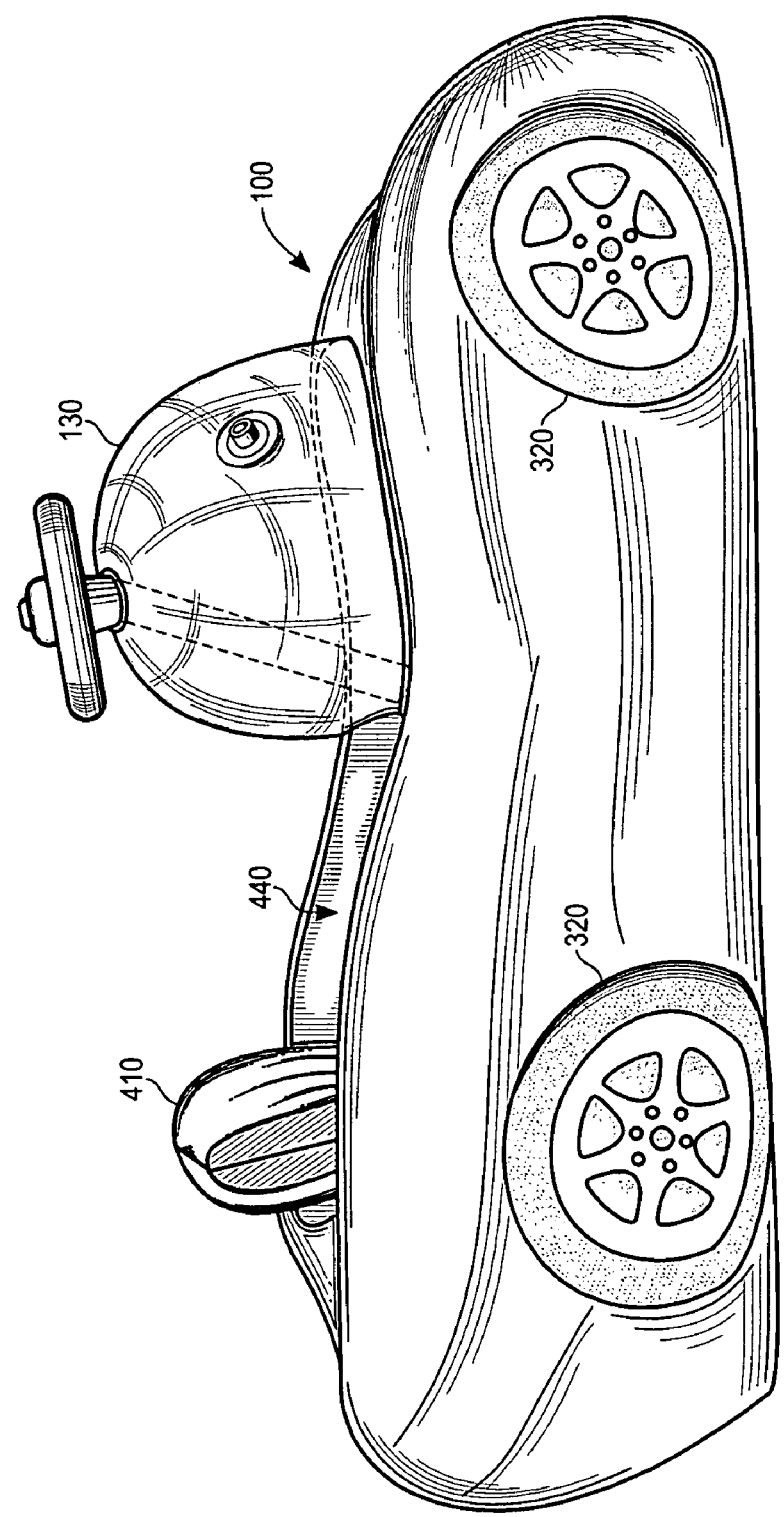
FIG. 4 is a side perspective view of the racecar styled bumper car.

FIG. 3 shows a racecar embodiment of the invention. Although appearing to be different, the racecar has a major shape difference in the front part of the device. The racecar also has an inflatable member 100 as well as a steering column 135 and steering wheel 136 having a control 138. The front part of the racecar is the shape of an inflated rectangle with sloping hood style. On the hood a pair of headlights 310 are painted on the surface of the outside inflatable member 100. Also, 2D wheels 320 are painted, or otherwise imprinted to the side fabric surface of the outside inflatable member 100. The 2D wheels 320 are not functional and do not necessarily match the location of the actual mechanical wheels. FIG. 4 shows the side view of the racecar embodiment of the invention. The straight seat back 410 can be seen protruding from the seating area 440 formed as a cavity 440 in the inflatable structure 100. The seat cell can be inflated separately so that a user has variable seat stiffness. Again, 2D wheels 320 conform to the fabric apparent on the side of the inflatable structure 100. Also, the steering column 135 and sleeve 134 can be seen protruding through the top of the steering column cell 130.

Figure 5:
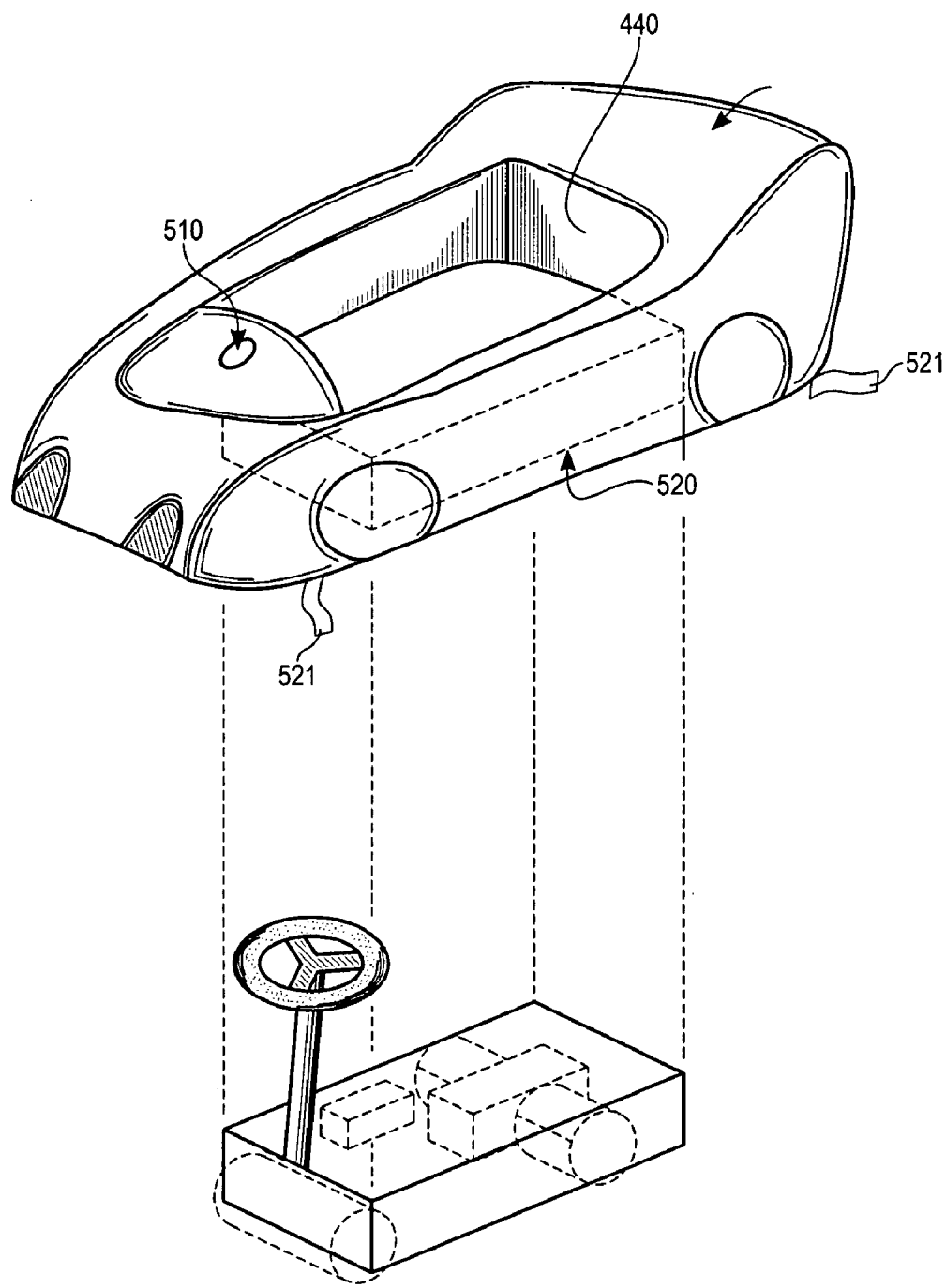
FIG. 5 is an exploded view of the present invention.

FIG. 5 shows an exploded view of the present invention. The inflatable structure 100 fits over the frame structure 500. The inflatable structure has a steering column hole 510 that is shown as a circular opening so that when assembled the steering wheel would protrude through the hole.

The seating area 440 is also provided on the inflatable structure. A rectangular cavity 520 shown in broken line is formed on the inflatable structure 100 and shaped to receive the mechanical system below that is located within the frame structure 500. The steering wheel 136 controls the front wheel.

The plastic casing 550 has a plurality of wheels rotational mounted to the plastic casing. The preferred embodiment is a tricycle configuration having three wheels 560. Preferably, the electric motor 562 fits between the rear wheels driving the rear wheels on the common axle. The battery 561 is also preferably placed within the plastic casing, and may be made accessible from the top of the plastic casing by a hatch. Because the device is electrically simple and low-speed, a single speed is sufficient for the purposes of the invention. The preferred method of electrical configuration is a simple on off switch where the control 138 is a push button closing a circuit that sends electricity to the motor driving the vehicle forward. When the push button is released, the vehicle slows and stops.

The steering column protruding from the plastic casing can be made rigid or flexible. The rigid embodiment has zero degrees of movement between the steering column and the plastic casing. The steering wheel mounted on top of the steering column rotates clockwise and counterclockwise directing the front wheel. The flexible embodiment allows the steering column to bend or pivot at the junction between the steering column and the plastic housing. The steering wheel rotates the steering member in the steering column. The steering wheel rotates the front wheel that steers left or right because the front wheel is mounted on a rotatable front steering assembly so that the wheel can be directed left or right. Because the steering mechanism is well-known in the art, a more detailed description is not necessary.

The inflatable structure has straps 521 to strap to the bottom frame structure. The inflatable structure has a cavity on its bottom shaped to receive the bottom frame structure. The bottom frame preferably formed as a housing having a plastic casing has locations receiving straps that are sewn to the inflatable structure and used to tie down the inflatable structure to the bottom frame.

The present invention is not limited to the sole embodiments described above, but encompasses all embodiments within the scope of the following claims.

The invention claimed is:

1. An inflatable bumper car comprising;
 a. an inflatable structure having a seating area and a lower cavity;
 b. a frame structure fitting within the lower cavity of the inflatable structure;
 c. a steering wheel having an electrical control;
 d. a plurality of wheels mounted on the frame structure.

2. The inflatable bumper car of claim 1 wherein the inflatable structure further comprises:
 a. a separately inflatable seat cell;
 b. a separately inflatable skirt cell that substantially surrounds the car.

3. The inflatable bumper car of claim 1 further comprising: a steering column that passes through the separately inflatable steering column cell.

4. The inflatable bumper car of claim 1 further comprising: a transparent steering column that passes through the separately inflatable steering column cell.

5. The inflatable bumper car of claim 1 wherein three wheels are mounted to the frame structure so that two rear wheels are driven by an electric motor while a single front wheel is steered by the steering wheel.

6. An inflatable bumper car comprising:
 a. an inflatable structure having a seating area and a lower cavity;
 b. a frame structure fitting within the lower cavity of the inflatable structure, and securely attaching to the inflatable structure;
 c. a steering wheel controlling the left to right direction of the inflatable bumper car;
 d. a plurality of wheels mounted on the frame structure.

7. The inflatable bumper car of claim 6 wherein the inflatable structure further comprises:
 a. a separately inflatable seat cell;
 b. a separately inflatable skirt cell that substantially surrounds the car.

8. The inflatable bumper car of claim 6 further comprising: a steering column that passes through the separately inflatable steering column cell.

9. The inflatable bumper car of claim 6 further comprising: a transparent steering column that passes through the separately inflatable steering column cell.

10. An inflatable bumper car comprising:
 a. an inflatable structure having a seating area and a lower cavity; wherein the inflatable structure is covered with durable fabric material having a printed design; the inflatable structure comprising a separately inflatable seat cell having a seat back and a separately inflatable skirt cell that substantially surrounds the car.
 b. a frame structure fitting within the lower cavity of the inflatable structure, and securely attaching to the inflatable structure;
 c. a steering wheel controlling the left to right direction of the inflatable bumper car;
 d. a plurality of wheels mounted on the frame structure.

11. The inflatable bumper car of claim 10 further comprising: a steering column that passes through the separately inflatable steering column cell.

12. The inflatable bumper car of claim 10 further comprising: a transparent steering column that passes through the separately inflatable steering column cell.

13. The inflatable bumper car of claim 10 wherein three wheels are mounted to the frame structure so that two wheels are driven by an electric motor while a single wheels is steered by the steering wheel.

* * * * *